United States Patent
Kunze et al.

(10) Patent No.: US 12,461,180 B2
(45) Date of Patent: Nov. 4, 2025

(54) COMPUTER-IMPLEMENTED METHOD, COMPUTER PROGRAM AND PROCESSING APPARATUS FOR RECONSTRUCTING A DYNAMIC SERIES OF MAGNETIC RESONANCE IMAGES

(71) Applicant: Siemens Healthineers AG, Forchheim (DE)

(72) Inventors: Karl-Philipp Kunze, London (GB); Radhouene Neji, London (GB)

(73) Assignee: Siemens Healthineers AG, Forchheim (DE)

( * ) Notice: Subject to any disclaimer, the term of this patent is extended or adjusted under 35 U.S.C. 154(b) by 230 days.

(21) Appl. No.: 18/329,632

(22) Filed: Jun. 6, 2023

(65) Prior Publication Data

US 2023/0400544 A1    Dec. 14, 2023

(30) Foreign Application Priority Data

Jun. 8, 2022    (EP) .................... 22177752

(51) Int. Cl.
*G01R 33/56* (2006.01)
*G01R 33/48* (2006.01)
*G01R 33/565* (2006.01)

(52) U.S. Cl.
CPC ..... *G01R 33/5608* (2013.01); *G01R 33/4818* (2013.01); *G01R 33/5601* (2013.01); *G01R 33/56509* (2013.01)

(58) Field of Classification Search
CPC ............ G01R 33/4818; G01R 33/5601; G01R 33/5608; G01R 33/56509
See application file for complete search history.

(56) References Cited

U.S. PATENT DOCUMENTS

| | | | |
|---|---|---|---|
| 9,390,521 B2 * | 7/2016 | Lin | ............... G06T 11/005 |
| 2008/0278160 A1 * | 11/2008 | Griswold | ........... G01R 33/5611 |
| | | | 324/307 |
| 2023/0010419 A1 | 1/2023 | Kunze et al. | |

FOREIGN PATENT DOCUMENTS

GB    2608404 A8    2/2023

OTHER PUBLICATIONS

Cernicanu A et al.:"Theory-based signal calibration with single-point T1 measurements for first-pass quantitative perfusion MRI studies". Academic Radiology 13, 686-693 (2006).

(Continued)

*Primary Examiner* — Gregory H Curran
(74) *Attorney, Agent, or Firm* — Harness, Dickey & Pierce, P.L.C.

(57) ABSTRACT

One or more example embodiments discloses a computer-implemented method of reconstructing a dynamic series of magnetic resonance images of a patient, comprising acquiring first and second k-space data of the patient; reconstructing at least one proton density weighted image based on the first k-space data; generating a dynamic series of processing images based on the second k-space data and temporal regularization; applying a motion correction to processing image based on an estimated motion; registering the proton density weighted image to the motion corrected image; and applying a signal intensity correction to the dynamic series of motion corrected images based on the proton density weighted image.

20 Claims, 6 Drawing Sheets

(56) References Cited

OTHER PUBLICATIONS

The Report of AAPM Task Group 118 "Parallel Imaging in MRI: Technology, Applications, and Quality Control" (ISBN: 978-1-936366-47-7; 2015 by American Association of Physi-ists in Medicine.

Huang, Feng et al:"K-T GRAPPA: A K-Space Implementation for Dynamic MRI With High Reduction Factor"; Magn. Reson. Med. 54: 1172-1184 (2005); vol. 54, No. 5, Jan. 1, 2005 (Jan. 1, 2005), pp. 1172-1184, XP055163493, ISSN: 0740-3194, DOI: 10.1002/mrm.20641.

Kellmann P. et al:"Myocardial perfusion cardiovascular magnetic resonance: optimized dual sequence and reconstruction for quantification". J Cardiovasc Magn Reson. 2017;19:43.

Adluru, Ganesh et al: "Temporally constrained reconstruction of dynamic cardiac perfusion MRI"; Magn. Reson. Med., vol. 57, No. 6, pp. 1027-1036, Jun. 2007; XP055021235, ISSN: 0740-3194, DOI: 10.1002/mrm.21248; 2007.

Unsupervised inline analysis of cardiac perfusion MRI; Xue et al., MICCAI, 741-749, 2009.

Kunze KP. et al.:"Measurement of extracellular volume and transit time heterogeneity using contrastenhanced myocardial perfusion MRI in patients after acute myocardial infarction". Magn Reson Med. 2017;77:2320-2330.

Kunze KP. et al.:"Myocardial perfusion quantification using simultaneously acquired 13NH3-ammonia PET and dynamic contrast-enhanced MRI in patients at rest and stress". Magn Reson Med. 2018;80: 2641-2654.

Breuer, Felix A. et al. "Dynamic Autocalibrated Parallel Imaging Using Temporal GRAPPA (TGRAPPA)" Magnetic Resonance in Medicine, vol. 53, pp. 981-985, 2005.

\* cited by examiner

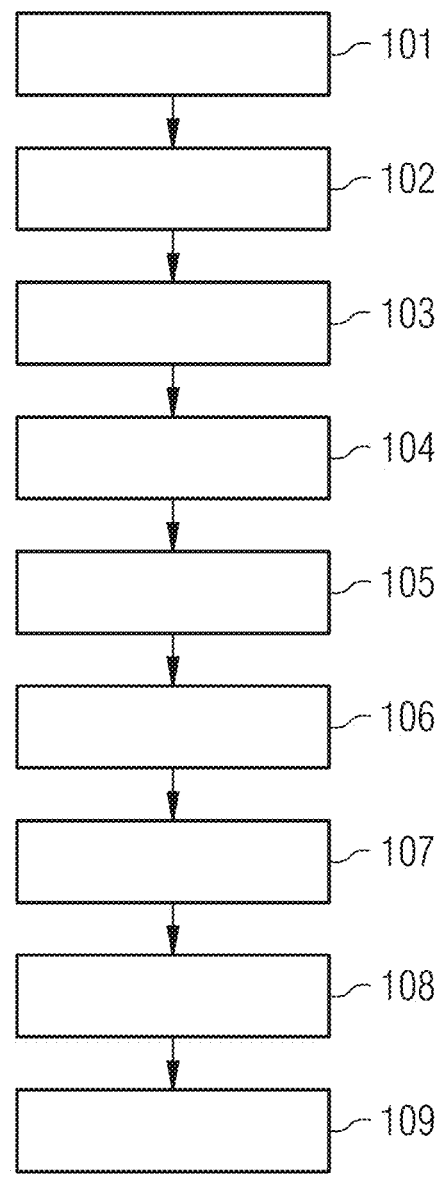

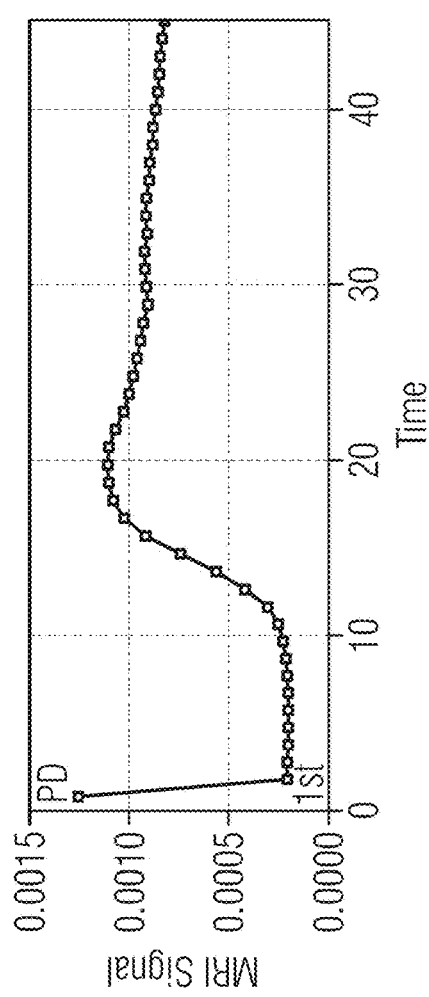
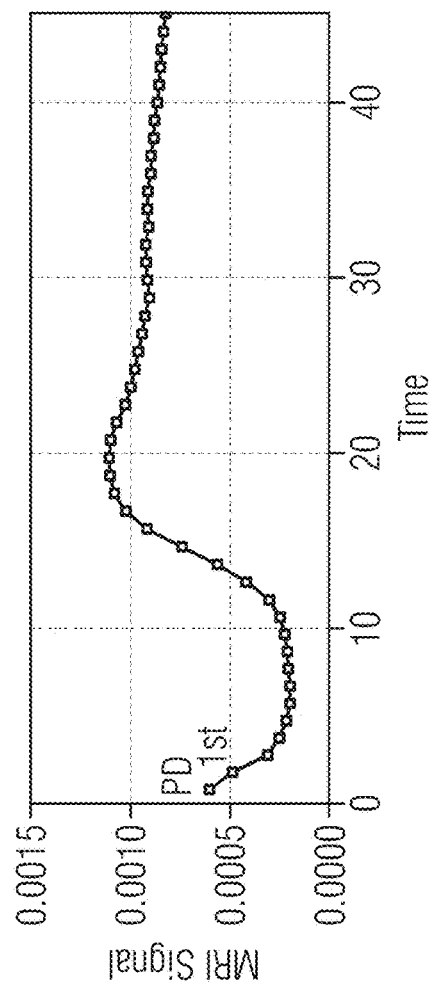
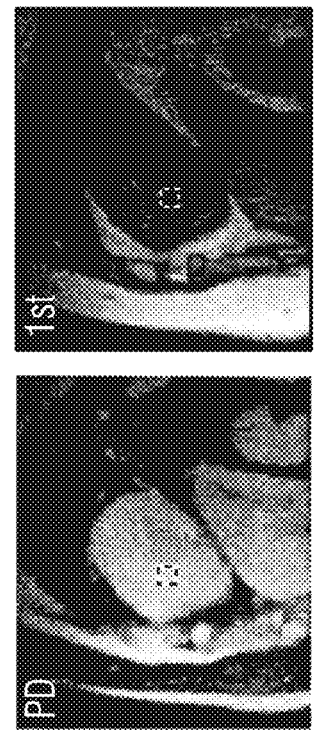
FIG 3A
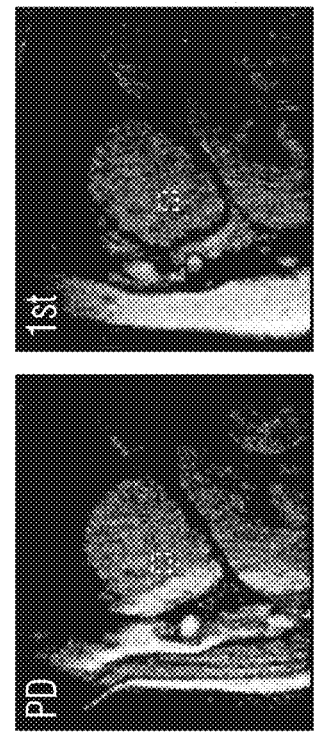
FIG 3B

COMPUTER-IMPLEMENTED METHOD, COMPUTER PROGRAM AND PROCESSING APPARATUS FOR RECONSTRUCTING A DYNAMIC SERIES OF MAGNETIC RESONANCE IMAGES

CROSS-REFERENCE TO RELATED APPLICATION(S)

The present application claims priority under 35 U.S.C. § 119 to European Patent Application No. 22177752.7, filed Jun. 8, 2022, the entire contents of which are incorporated herein by reference.

FIELD

One or more example embodiments relates to a computer-implemented method of reconstructing a dynamic series of magnetic resonance image of a patient.

RELATED ART

Magnetic resonance imaging (MRI) is used frequently in medical applications as a diagnostic and staging tool. A patient is exposed to a static magnetic field B0 and an incident pulsed RF (radio-frequency) signal, which excite the nuclear spin energy transition in hydrogen atoms present in water and fat in the body. Magnetic field gradients are used to localize the resulting magnetization in space, leading to the generation of an image. Varying the parameters of the pulse sequence used to excite the nuclear spin energy transition creates different contrasts between tissues due to the relaxation properties of the hydrogen atoms. Such imaging techniques are used in neurological, cardiovascular, musculoskeletal, and gastrointestinal investigations, as well as angiography. Images may or may not be obtained with the use of contrast agents, such as gadolinium, to highlight features of interest.

In cardiovascular imaging one major issue encountered in the reconstruction of images obtained using MRI is the handling of motion corruption. Typically, MRI acquisition relies on the patient remaining very still, which for scans of limbs or the spine, for example, is likely to be sufficient to ensure the acquisition of an uncorrupted image. However, in cardiovascular imaging motion compensation is a key topic as cardiac motion and/or respiratory motion can create corruption within the final MRI image, regardless of whether this is a static or a dynamic image.

In dynamic MRI imaging challenges arise from the need to capture multiple images of tissue perfusion after injection with a contrast agent, with each image having a small temporal footprint. Typically, this requires a series of very fast (of the order of 25 ms to 1000 ms) single-shot image acquisitions, which when combined span a time window of the order of tens of seconds to several minutes, depending on the organ of interest and/or the characteristics of the contrast agent. Whilst respiratory and/or cardiac motion may be frozen during each individual acquisition, relative motion between acquisitions across the series of single shot images introduces several challenges for image analysis and reconstruction.

In image reconstruction, it is desirable to use frameworks employing some form of regularization through time in order to use the data redundancy across the dynamic image series. This enables a higher acceleration for individual acquisitions to be achieved, which, in turn, can be used to gain image resolution or improve morphologic coverage.

Both resolution and morphologic coverage are key factors in the clinical application of dynamic MRI. In the case of myocardial perfusion imaging, the detection of small perfusion defects is essential, hence the need for a higher spatial resolution, in addition to which the morphological coverage in standard clinical techniques is limited to three slices, which may not be sufficient.

One further issue is that regularization through time does not tend to perform well in the presence of motion. Separating, during reconstruction, the effects of motion, MRI artifacts, and changes in image contrast across a dynamic series MRI due to the inflow of contrast agent is not straightforward. Whilst various models exist that include an explicit motion model in the reconstruction, for example, in the form of motion fields, obtaining accurate and detailed motion information from the highly undersampled data of each single shot acquisition in the first place remains challenging.

The simplest strategy employed for applications across all organs is the use of breath holding. However, the achievable breath hold varies from patient to patient, and is usually too short to be able to perform perfusion analysis. This is especially true of particularly unwell patients, who may not be able to hold their breath at all. Even optimal breath holding of around twenty-five seconds does not allow for data analysis using more advanced quantitative methods that require longer windows of kinetic data. In addition, the breath hold must be timed precisely with the injection of a contrast agent, which poses a significant logistical challenge to clinical workflow and patient communication.

An alternative to breath holding is to utilize free-breathing acquisition with retrospective motion correction. This is where the images forming a dynamic series are aligned after reconstruction with respect to respiratory positions. For common reconstructive approaches, such as GeneRalised Autocalibrating Partial Parallel Acquisition (GRAPPA) and Sensitivity Encoding (SENSE), there is no inclusion of temporal regularization across the dynamic series. This limits the use of such techniques to low acceleration factors and consequently low spatial resolution and morphological coverage.

Whilst several reconstruction techniques employing temporal regularization have been proposed, these often rely on specific assumptions regarding the nature of the underlying respiratory and/or cardiac motion. For example, assuming an inherent periodicity and therefore a sparsity in some domain of MRI encoding. Whilst most physiological motion is in general periodic this is not necessarily the case in patients exhibiting intermittent deep breathing or cardiac arrythmias. This leads to very inhomogeneous respiratory and/or cardiac motion. For dynamic MRI, other approaches exist that make similar assumptions with regards to the separability of the motion and contrast changes due to the injection of the contrast agent on one hand, and MRI undersampling on the other. These assumptions are also not generally robust in the light of the irregular motion and perfusion patterns seen in a clinical environment. Other more recent approaches have been aimed at incorporating an explicit motion model, such as motion fields, that include all of the potentially irregular respiratory and/or cardiac motion into the regularization or data consistency terms of the dynamic data reconstruction.

For myocardial applications, precise localization of perfusion defects is crucial to identify the corresponding pathological coronary artery branch. Due to its location and geometry, the myocardium is subject to a significant B1 (radiofrequency field) sensitivity gradient from surface receive coils, leading to large image signal gradients between septal/anterior and lateral territories that can be mistaken for diagnostically relevant perfusion deficits. Therefore, both qualitative/visual and fully quantitative assessments of perfusion data must employ some explicit or implicit form of surface coil intensity correction (SCIC).

The basis for SCIC is usually a proton density weighted image (PD image) that is acquired before contrast agent injection in place of the first (few) image(s) of the dynamic series by omitting magnetization preparation and potentially reducing the flip angle. Acquiring a PD image of myocardium is for example carried out without saturation preparation and a flip angle of 5 deg., wherein the images acquisition of the perfusion series is for example carried out with a saturation preparation and a flip angle of 15 deg.

Because PD image contrast across the myocardium ideally only consists of the coil profile to be corrected for, its contrast is fundamentally different from the rest of the usually saturation-prepared dynamic series. This difference is greatest for the directly adjacent, low-signal baseline frames, and slightly reduces over time as contrast agent wash-in reduces T1 times of most tissues.

The contrast difference between PD images and diagnostic part of the dynamic and/or perfusion image series poses two main challenges to highly accelerated myocardial perfusion imaging using reconstructions with regularization through time:

1. With respect to temporal regularization constraints, the assumption of smooth signal transitions that is usually implied in these cannot be reconciled with the inherent, sharp signal edge between PD and perfusion images.
2. Motion (cardiac or respiratory) between frames of the dynamic series needs to be corrected before analysis, in the case of a reconstruction with regularization through time already during the reconstruction to avoid blurring. Most registration approaches employ contrast-based metrics that are unreliable in the presence of fundamentally different image contrast between the images to be registered. Even methods that rely on statistical and information theory metrics like mutual information-based registration can fail in a fair number of cases.

A simple strategy to tackle the problem of registering PD images with the rest of the series would be breath holding, with or without a temporally constrained reconstruction. However, breath holds including PD frames at the start of the acquisition as well as the diagnostically relevant parts of the contrast agent wash-in would have to be >30 s, which is unrealistic.

For free-breathing acquisitions, intensity-based motion compensation approaches may be adapted to allow some degree of contrast changes, e.g. via a consecutive update of the reference image, and/or special handling for expected differences such as PD acquisitions at the start, as described by (Xue H, Zuehlsdorff S, Kellman P et al. (2009) Unsupervised Inline Analysis of Cardiac Perfusion MRI. MICCAI 2009. MICCAI 2009. Lecture Notes in Computer Science, vol 5762). Yet these fail frequently due to the complexity of the problem and often result in failures in alignment. Especially for quantitative perfusion imaging, the impact of misregistration between the PD image used for signal normalization/SCIC and the rest of the dynamic series can lead to large errors in the estimated tissue perfusion.

SUMMARY

One or more example embodiments addresses these issues, by providing, in a first aspect, a computer-implemented method of reconstructing a dynamic series of motion-compensated magnetic resonance images of a patient, comprising: acquiring first k-space data of at least one proton density weighted image of the patient, acquiring over time second k-space data of a dynamic series of magnetic resonance images of the patient over successive respiratory and/or cardiac cycles, reconstructing at least one proton density weighted image based on the first k-space data, generating a dynamic series of processing images, comprising at least two processing images, wherein generating the dynamic series of processing images comprises reconstructing the at least two processing images based on the second k-space data, estimating a motion between the processing images and applying, for each processing image, a motion correction to processing image based on the estimated motion, wherein a dynamic series of motion corrected images is generated, registering the at least one proton density image to at least one motion corrected image of the dynamic series of motion corrected images, applying a signal intensity correction to the dynamic series of motion corrected images based on the at least one proton density image, and providing the signal intensity corrected dynamic series of motion corrected images.

BRIEF DESCRIPTION OF THE DRAWINGS

One or more example embodiments will now be described by way of example only, and with reference to the accompanying drawings, in which:

FIG. 1 a flow chard of a method for reconstructing a dynamic series of magnetic resonance images of a patient according to one or more example embodiments;

FIGS. 3A-3B illustrate proton density weighted images and time-intensity curves, respectively, according to one or more example embodiments;

DETAILED DESCRIPTION

Figure 2A:
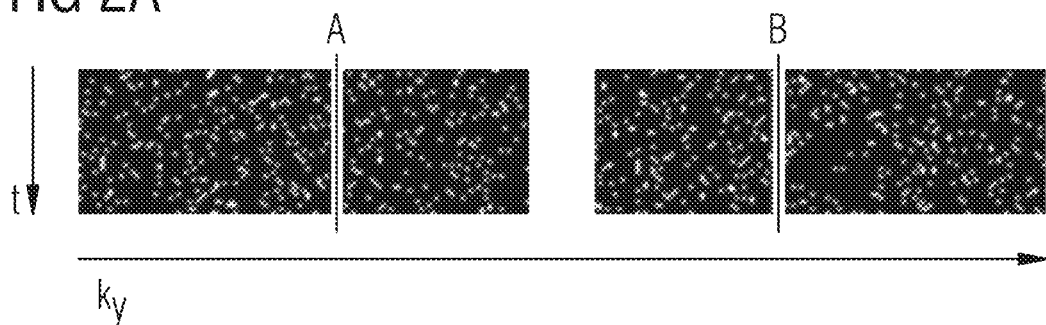
FIGS. 2A-2C is a series of example k-space data sampling patterns according to one or more example embodiments.

The step of acquiring first k-space data of at least one proton density weighted image of the patient is carried out by or based on a magnetic resonance tomograph. The first k-space data are acquired for an imaging section of the patient, especially an imaging section comprising the heart and/or myocardium. The first k-space data may be 2D or 3D MRI (magnetic resonance imaging) data. The first k-space data are acquired before acquiring second k-space data. The first k-space data are preferably acquired before usage of a contrast agent. The first k-space data are acquired with a first image resolution and on a frame-by-frame basis. The first k-space data are acquired while the patient is freely breathing or while breath holding. Acquiring the first k-space data may be done in two dimensions using a single phase-encoding dimension of k-space. The first k-space data are preferably acquired by undersampling the k-space, wherein undersampling is in particular the decrease in data, usually in the phase-encoding direction, to increase image acquisition speed, leading to shorter scan times without loss of data quality.

The step of acquiring second k-space data of the dynamic series of magnetic resonance images of the patient is carried out by or based on a magnetic resonance tomograph. The dynamic series of magnetic resonance images may be 2D or 3D dynamic MRI (magnetic resonance imaging data). The second k-space data are acquired for a second imaging section of the patient, especially comprising the imaging section of the first k-space data, the heart and/or myocardium. The second k-space data are acquired after acquiring first k-space data. The second k-space data are preferably acquired using a contrast agent, especially starting with injection of the contrast agent until the contrast agent is distributed in the second imaging section, the heart and/or the myocardium. Preferably, the second k-space data are acquired with a second image resolution and on a frame-by-frame basis. The second k-space data are acquired while the patient is freely breathing or while breath holding. Acquiring the second k-space data may be done in two dimensions using a single phase-encoding dimension of k-space. The second k-space data are preferably acquired by undersampling the k-space. The dynamic series of magnetic resonance images is configured for diagnostics, e.g. by an software, AI or human analysis.

At least one proton density weighted image is reconstructed based on the first k-space data. Preferably, a time series of proton density weighted images is reconstructed based on the first k-space data. Optionally, first k-space data for different magnetization preparations, different flip angles, different sampling patterns and/or different resolutions are acquired, wherein the proton density weighted images based on different magnetization preparations, different flip angles, different sampling patterns and/or different resolutions are reconstructed. The PD images are reconstructed separately without temporal regularization but potentially with spatial regularization.

In case, the first k-space data are acquired together with the second k-space data, e.g., in the same MR scan, the first k-space data are separated from the second k-space data.

The step generating the dynamic series of processing images comprises generating at least two processing images, especially a plurality of processing images. The processing images are for example a stream of processing images. The processing images are part of the dynamic series of processing images or forming the dynamic series of processing images. Generating the processing images is based on the second k-space data. The at least two processing images are especially generated as reconstruction based on the second k-space data. The reconstruction may comprise a regularization constraint across the dynamic series of processing images. The regularization constrained may comprise a temporal and/or spatial regularization constraint. Preferably, a spatial regularization of the individual image frames and a temporal regularization constraint across the dynamic series of processing images is carried out.

The method comprises the step estimating a motion between the processing images. The motion can be estimated by analyzing the dynamic series of processing images, especially at least two, in particular temporal adjacent, processing images. The motion can be estimated by determining an optical flux based on the dynamic series of processing images. The motion is especially based on cardiac and/or respiratory motion. The motion is preferably estimated as a vector field, especially as a motion field.

The method comprises the step applying a motion correction to the dynamic series of processing images. To at least two of the processing images, preferably to all processing images, the motion correction is applied. The applied motion correction is based on the estimated motion, especially on the optical flux and/or the vector field. The motion correction can be configured and/or understood as a motion compensation. The motion correction may, additionally or alternatively, be implemented by the method as part of a motion-compensated reconstruction of the processing images based on the second k-space data. Motion correction is especially configured to align images forming a dynamic series after reconstruction with respect to respiratory positions. For common reconstruction approaches, such as GeneRalised Autocalibrating Partial Parallel Acquisition (GRAPPA) and SENSitivity Encoding (SENSE) are known. Applying the motion correction to the processing images and/or to the dynamic series of processing images provides a dynamic series of motion corrected images is generated. The dynamic series of motion corrected images comprises a plurality of motion corrected images.

The method comprises the step registering the at least one proton density weighted image to at least one motion corrected image of the dynamic series of motion corrected images. Especially, a plurality of the reconstructed PD images is registered to the motion corrected images. Preferably, the PD image is registered with the last or one of the last motion corrected images of the dynamic series of motion corrected images. The PD image is particularly registered to a motion corrected image, which has already been registered to the rest of the dynamic series of motion corrected images. The registration can employ contrast-based metrics or rely on statistical and information theory metrics like mutual information-based registration.

The method comprises the step applying a signal intensity correction to the dynamic series of motion corrected images based on the at least one proton density weighted image. The signal correction is preferably applied to each of the motion corrected images of the dynamic series of motion corrected images. The signal intensity correction may comprise a correction of the second k-space data corresponding to the image to be corrected and/or comprise a correction of pixels in the image to be corrected. Because PD image contrast across the myocardium ideally only consists of the coil profile to be corrected for, its contrast is fundamentally different from the rest of the usually saturation-prepared dynamic series. The signal intensity correction may comprise some explicit or implicit form of surface coil intensity correction (SCIC) or signal normalization, especially for quantification. The signal intensity correction is especially configured for perfusion quantification, where PD images are being used for signal-to-concentration modelling, delivering an implicit SCIC, biases in absolute PD image signal will propagate in a highly non-linear fashion and corrupt diagnostically relevant information.

The method comprises the step providing the signal intensity corrected dynamic series of motion corrected images. The signal intensity corrected dynamic series of motion corrected images, especially the signal intensity corrected and motion corrected images are provided. Providing may comprise presenting and/or displaying them on a monitor and/or provide them as data, e.g. storing them on a storage medium, a cloud or provide them at a data interface.

In a preferred embodiment the step of acquiring the second k-space data undersamples the k-space and is acquiring the second k-space data with an acceleration factor bigger than 3, preferably bigger than 5 and in particular bigger than 7. Furthermore, the step of acquiring the first k-space data may undersample the k-space and is acquiring the first k-space data with an acceleration factor smaller than the acceleration factor for acquiring the second k-space data. The acceleration factor for the acquisition of the first k-space data is preferably bigger than 2 and in particular bigger than 5. The acceleration factor is also called reduction factor R, is preferably defined as the ratio of the amount of k-space data required for a fully sampled image to the amount collected in an accelerated acquisition. Preferably, the first and/or second k-space data is acquired using a variable density trajectory imaging method, e.g., using a technique such as VD-CASPR. This means that the density of the samples in k-space increases towards the center of k-space.

Preferably, the step of acquiring first k-space data is carried out with a first image resolution, at a first magnetization preparation and at a first flip angle, wherein the step of acquiring second k-space data is carried out with a second image resolution, at a second magnetization preparation and at a second flip angle. Preferably, the first image resolution is different from the second image resolution, the first image resolution is especially smaller than second image resolution. Particularly, the first magnetization preparation is especially different from the second magnetization preparation. The first magnetization preparation is for example without saturation preparation, wherein the second magnetization comprises a saturation preparation. The first flip angle is preferably different from the second flip angle. Especially, the first flip angle is smaller than the second flip angle, e.g., the first flip angle is smaller than 7 degrees and the second flip angle is larger than 10 degrees.

Preferably, the step of acquiring the first k-space data is acquiring the first k-space data based on a sampling pattern. Particularly, the step of acquiring the second k-space data is acquiring the second k-space data based on a sampling pattern. The sampling pattern for acquiring the first and second k-space data are preferably different, alternatively the sampling patterns are the same. The sampling pattern samples outer parts of the k-space more sparsely than inner parts of the k-space. The sampling patterns are preferably configured to sample the outer parts of the k-space in kx- and/or ky-direction more sparsely than the inner parts. The sampling pattern may include common patterns such as Cartesian, spiral and radial sampling.

For example, acquiring the first and/or second k-space data is based on a multi-shot three-dimensional magnetic resonance imaging pulse sequence utilizing a plurality of shots to obtain MR data, includes defining a sampling pattern in a ky-kz plane, the sampling pattern comprising a plurality of views in the ky-kz plane, partitioning the ky-kz plane into a plurality of blades.

The sampling pattern is preferably based on parallel imaging, especially parallel MRI Dynamic imaging is the successive acquisition of images from the same tissue volume for the purpose of following the time course of physiological events. Typical goals of dynamic MRI are to acquire images of an object in motion (e.g., cardiac function) or to follow a contrast agent as it makes its way through the body (e.g., perfusion imaging). Unfortunately, limitations in gradient performance and physiological constraints (e.g., peripheral nerve stimulation) restrict image acquisition speeds gained exclusively from faster gradient pulsing. Since pMRI can produce images without having to fill the full k-space volume at each acquisition time, imaging speed can be increased without changing gradient performance. In cine sequences for evaluating cardiac function, pMRI can reduce the required number of cardiac triggers, significantly diminishing the artifacts due to missed triggers or reduce the length of a breath-hold. Parallel MR imaging allows increased spatial coverage of the heart or the breast without increasing the acquisition time so that the uptake curves can be displayed with sufficient temporal resolution to distinguish normal from pathological enhancement patterns. In addition, pMRI concepts can be extended to further reduce the number of lines acquired per image by taking advantage of information obtained from the same volume of tissue at various times. Unlike standard protocols that acquire images covering one volume during acquisition, dynamic imaging acquires many images throughout time. Correspondingly, the standard protocol acquires data within a volume of k-space to assemble the spatial image, whereas dynamic imaging protocols acquire data within both k-space and t-space to assemble many images over time. With the standard pMRI, data acquisition is accelerated by collecting only a fraction of k-space and reconstructing the missing data. Parallel MRI is one technique that follows this approach. Examples of sampling patterns are disclosed in THE REPORT OF AAPM TASK GROUP 118 "Parallel Imaging in MRI: Technology, Applications, and Quality Control" (ISBN: 978-1-936366-47-7; 2015 by American Association of Physicists in Medicine). One difference between standard pMRI and pMRI in dynamic acquisitions is that data can be undersampled in both k-space and in time. Dynamic pMRI is used to examine changes within a region over time. Because the expected change is small or negligible in certain parts of the image over time, a dynamic image series possesses some degree of spatio-temporal correlation. The domain of these spatio-temporal correlations is often called k-t space, and one can perform an equivalent technique to pMRI by collecting a fraction of data within k-t space. Using this approach, the data comprising each image in the dynamic protocol is undersampled in k-space, and this sampling pattern is altered as time progresses. To reconstruct the missing data, data sampled at different places in k-space and at different times are used. Reducing scan time in dynamic imaging by taking advantage of temporal correlations does not require pMRI. A dynamic imaging strategy alternately samples even and odd lines in k-space over time and zero-fills the rest. Dynamic pMRI adopts approaches incorporates them into the pMRI scheme.

The sampling pattern is preferably based and/or configured as disclosed in the patent application GB 2608404 A8. It may be beneficial to decrease the resolution of the PD image. For the example original samples outside a pre-defined resolution band, e.g., a 2.5 mm$^2$-resolution band, can be migrated to within, so that a reconstruction at 2.5 mm$^2$ without temporal regularization would yield a better result. Changing the total amount of samples between PD weighted images, especially first k-space data, and the dynamic processing image series, especially second k-space data, is not allowed as it would introduce differences in the temporal acquisition footprint between cardiac cycles.

Particularly, the step of generating the dynamic processing image series comprises temporal and/or spatial regularization of the individual processing images. Existing approaches for (spatio-) temporal regularization may use edge preserving regularization approaches (Total Variation, Wavelets) that, to some degree, preserve sharp changes in image contrast over time. The spatial and temporal regularization preferably uses total variation (TV), total generalized variation (TGV), a combination of low-rank decomposition (LRD) and TV (LRD+TV), a combination of LRD and TGV (LRD+TGV), and/or nuclear norm (NN).

Preferably, the step of reconstructing at least one proton density weighted image comprises a spatial regularization.

The reconstruction of the proton density weighted image is in particular carried out without a temporal regularization.

Particularly, the step applying a signal intensity correction comprises a surface coil intensity correction (SCIC) based on the proton density image. The basis for SCIC is usually a PD weighted image that is acquired before contrast agent injection in place of the first (few) image(s) of the dynamic series by omitting magnetization preparation and potentially reducing the flip angle. Because PD weighted image contrast across the myocardium ideally only consists of the coil profile to be corrected for, its contrast is fundamentally different from the rest of the usually saturation-prepared dynamic series of processing images. This difference is greatest for the directly adjacent, low-signal baseline frames, and slightly reduces over time as contrast agent wash-in reduces T1 times of most tissues. Possible surface coil intensity corrections are disclosed in "Myocardial perfusion quantification using simultaneously acquired 13NH3-ammonia PET and dynamic contrast-enhanced MRI in patients at rest and stress" (Kunze K P, Nekolla S G, Rischpler C et al., Magn Reson Med. 2018; 80: 2641-2654), "Theory-based signal calibration with single-point T1 measurements for first-pass quantitative perfusion MRI studies" (Cernicanu, A. & Axel, L., Academic Radiology 13, 686-693 (2006)), "Myocardial perfusion cardiovascular magnetic resonance: optimized dual sequence and reconstruction for quantification" (Kellman P, Hansen M S, Nielles-Vallespin S, et al., J Cardiovasc Magn Reson. 2017; 19:43) and "Measurement of extracellular volume and transit time heterogeneity using contrastenhanced myocardial perfusion MRI in patients after acute myocardial infarction" (Kunze K P, Rischpler C, Hayes C, et al., Magn Reson Med. 2017; 77:2320-2330).

Optionally, the step applying a signal normalization is carried out as part of a dynamic T1 quantification for absolute quantification of perfusion flow values.

Preferably, the step acquiring the first k-space data is carried out before administering a contrast agent. In other words, the first k-space data are acquired without using a contrast agent. In particular, the step acquiring the second k-space data is carried out, completely or in part, after administering the contrast agent. In other words, the second k-space data are acquired based on the application of a contrast agent. The contrast agent is preferably based on gadolinium. The contrast agent is for example administered and/or infused beginning at a time tC, especially for a time interval $\Delta tC$, wherein the first k-space data are acquired from a time t1 until a time t2, wherein t1<t2<tC. The second k-space data are for example acquired from a time t3 to a time t4, wherein t4>t3>tC. The second k-space data are acquired for a time interval $\Delta t2=t4-t3$, wherein the time interval $\Delta t2$ can be bigger than $\Delta tC$ or smaller than $\Delta tC$. In other words, the second k-space data may be acquired for a time after finishing the administering of the contrast agent.

Optionally, the second k-space data for the dynamic series of processing images and/or the motion corrected images are acquired for an acquiring time interval after an administering date, for example for the acquiring time interval $\Delta t2$ after the administering data tC. The step registering the at least one PD image to at least one motion corrected image of the dynamic series is carried out with a motion corrected image acquired or based on second k-space data acquired in a last third of the acquiring time interval after the administering date, preferably in a last tenth of the acquiring time interval.

Especially, the step registering the at least one PD image to at least one motion corrected image of the dynamic series is carried out with the last motion corrected image or one of the last ten motion corrected images of the dynamic series of the motion corrected images. These embodiments are based on the recognition, that the difference in the contrast between the PD image and the dynamic series is largest shortly after administering the contrast agent and reduces over time, when the contrast agent is washed in.

According to a preferred embodiment the first k-space data and the second k-space are acquired for the heart of the patient and/or for the myocardium. In other words, the PD image and the magnetic resonance images of the dynamic series shows and/or comprises a section of the heart or the whole heart. The dynamic series of magnetic resonance images, the dynamic series of processing, motion corrected, or signal intensity corrected images shows the section of the heart or the whole heart over a part or the whole cardiac cycle. The dynamic series of signal intensity corrected images as adapted for quantitative and/or qualitative cardiac perfusion MRI.

In a second aspect, one or more embodiments also provide a computer program comprising instructions, e.g., a program code, which, when executed by a computer, cause the computer to carry out the steps of the method of reconstructing a dynamic series of magnetic resonance images of a patient outlined above.

In a third aspect, one or more embodiments also provide a machine readable medium, e.g., a CD, DVD or USB-storage, wherein the computer program, especially the instruction and/or program code, is stored at the machine readable medium.

In a fourth aspect, one or more embodiments of the present invention also provide a data processing apparatus adapted to reconstruct a dynamic series of magnetic resonance images of a patient, comprising:

an imaging device adapted to acquire first k-space data of at least one proton density image of the patient and second k-space data of a dynamic series of magnetic resonance images of the patient over successive respiratory and/or cardiac cycles;

a processor adapted to reconstruct at least one proton density weighted image based on the first k-space data, to generate a dynamic series of processing images, comprising at least two processing images, wherein generating the dynamic series of processing images comprises reconstructing the at least two processing images based on the second k-space data, to estimate a motion between the processing images, to apply a motion correction to processing image based on the estimated motion, wherein a dynamic series of motion corrected images is generated, to register the at least one proton density weighted image to at least one motion corrected image of the dynamic series of motion corrected images, to apply a signal intensity correction to the dynamic series of motion corrected images based on the at least one proton density image;

an interface adapted to provide the signal intensity corrected dynamic series of motion corrected images.

FIG. 1 shows a flow chard of a method for reconstructing a dynamic series of magnetic resonance images of a patient according to one or more example embodiments. The method 100 starts, at step 101, with acquiring over time, at a first image resolution and on a frame-by-frame basis, first k-space data. The first k-space data can be acquired over successive respiratory and/or cardiac cycles. The patient is preferably free-breathing for at least a portion of the time over which the first k-space data is obtained. Acquisition of the first k-space data is preferably carried out with a sampling pattern, leading to k-space data comprising a first subset of data points having a first sample density and a second subset of data points having a second sample density. The first subset of data points has a greater sample density than the second subset of data points, as the first subset of data points is a region undersampled coherently, and the second subset of data points is a region undersampled incoherently. Desirably, the region undersampled coherently is a linearly undersampled region, such as a time-interleaved undersampling scheme, as in Temporal Generalised Auto-calibrating Partial Parallel Acquisitions T (GRAPPA) and is located so that it is centered around the center of k-space. The second subset of points is temporally incoherent, with a random or pseudo-random sampling scheme, such as the randomly sampled Compressed-Sensing patterns. The second subset of points therefore surrounds this central region on either side of the one-dimensional k-space plot.

Next, at step 102, a contrast agent is given, especially by infusion or injection, to the patient. This is carried out at a time tC. After the time tC the contrast agent washes in the tissue of the patient and contrast in MRI.

Next, at step 103, second k-space data of a dynamic series of magnetic resonance images are acquire over time. The acquisition of the second k-space data of the patient is carried out with a second image resolution and on a frame-by-frame basis. The second k-space data can be acquired over successive respiratory and/or cardiac cycles. The patient is preferably free-breathing for at least a portion of the time over which the second k-space data is obtained. Acquisition of the second k-space data is preferably carried out with a sampling pattern, especially as described for the step 101.

At the step 104 at least one proton density weighted image is reconstructed. The reconstruction is carried out based on the first k-space data. The reconstruction employed spatial regularization but no temporal regularization in order to preserve the fidelity of individual motion fields. Spatial regularization of the individual frames may be carried out to reduce any remaining incoherent aliasing from the non-coherently undersampled regions.

At the step 105 a dynamic series of processing images is generated. The dynamic series of processing images comprises a plurality of processing images. The processing images are generated based on reconstruction, wherein the reconstruction is based on the second k-space data. The reconstruction of the processing images is carried out on individual image frames at a second resolution. The reconstruction of the processing images may employ spatial and/or temporal regularization constraints. Techniques such as total-variation (TV) regularization, which assumes a piece-wise constant image and preserves the edge structure of the image, may be used. The use of such spatial regularization does not corrupt the depiction of motion states in individual frames.

At step 106 a motion estimating between the processing images is carried out. The motion between the processing images is estimated in the form of motion fields. For this, each processing image representing a single time frame is iteratively distorted onto a specific reference frame within the same dynamic series of processing images to create vector fields representing the distortion across the dynamic series.

Next, at step 107 each processing image of the dynamic series of processing images is motion corrected. The motion correction is carried out based estimated motion of step 105, wherein a dynamic series of motion corrected images is generated. The reconstruction comprises a temporal regularization constraint across the dynamic series of magnetic resonance images. Preferably, a spatial regularization of the individual image frames and a temporal regularization constraint across the dynamic series of magnetic resonance images is carried out. This is done by incorporating the motion information either into an MRI encoding operator, or into a regularization constraint across all motion states.

At the step 107 at least one proton density image is registered to at least one motion corrected image of the dynamic series of motion corrected images. The registration of the proton density weighted image is preferably carried out to one of the last, especially the last, motion corrected images of the dynamic series. This is beneficial since the contrast between the proton density weighted image and the motion corrected images of the dynamic series with increasing time after tC.

At the step 108 a signal intensity correction is applied to the dynamic series of motion corrected images. The signal intensity correction is carried out based on the at least one proton density weighted image. The signal intensity correction comprises preferably a surface coil intensity correction of the motion corrected images based on the proton density weighted image. At step 109 the signal intensity corrected dynamic series of motion corrected images is provided.

Figure 2B:
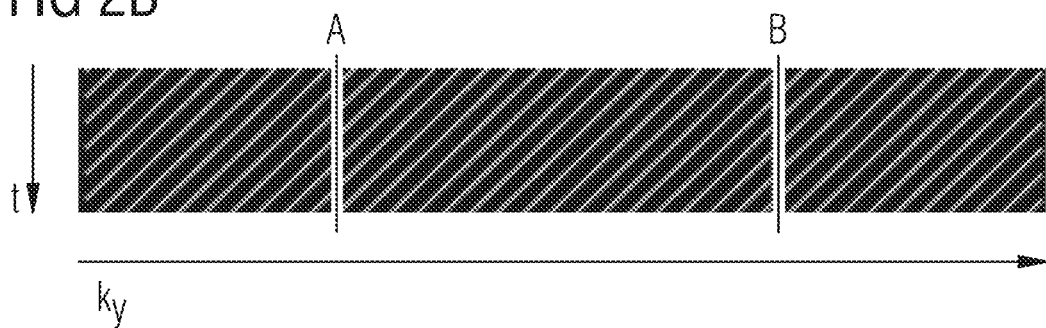
Figure 2C:
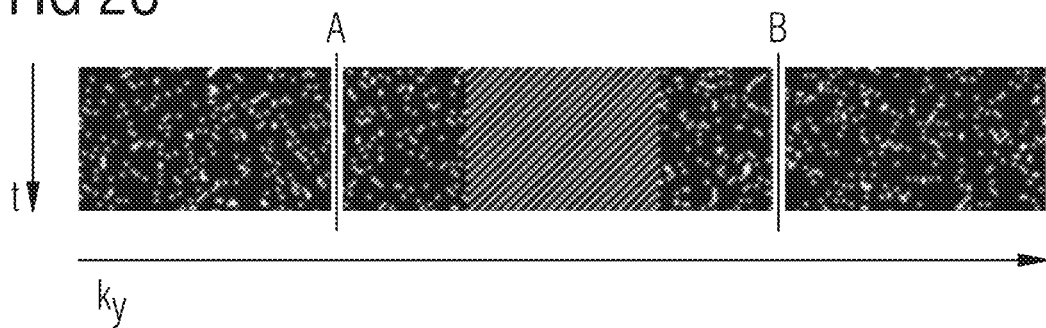
Figure 4A:
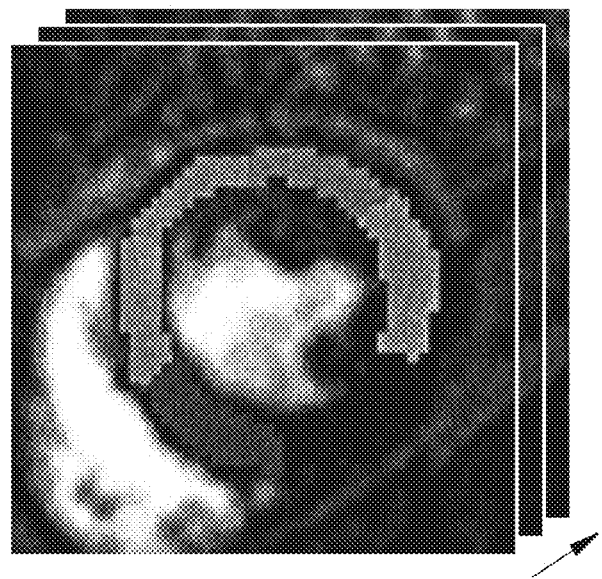
FIGS. 4A-4D illustrate a visualization of surface coil intensity correction according to one or more example embodiments, and FIG. 5 data processing apparatus adapted to reconstruct a dynamic series of magnetic resonance images of a patient according to one or more example embodiments.
Figure 4B:
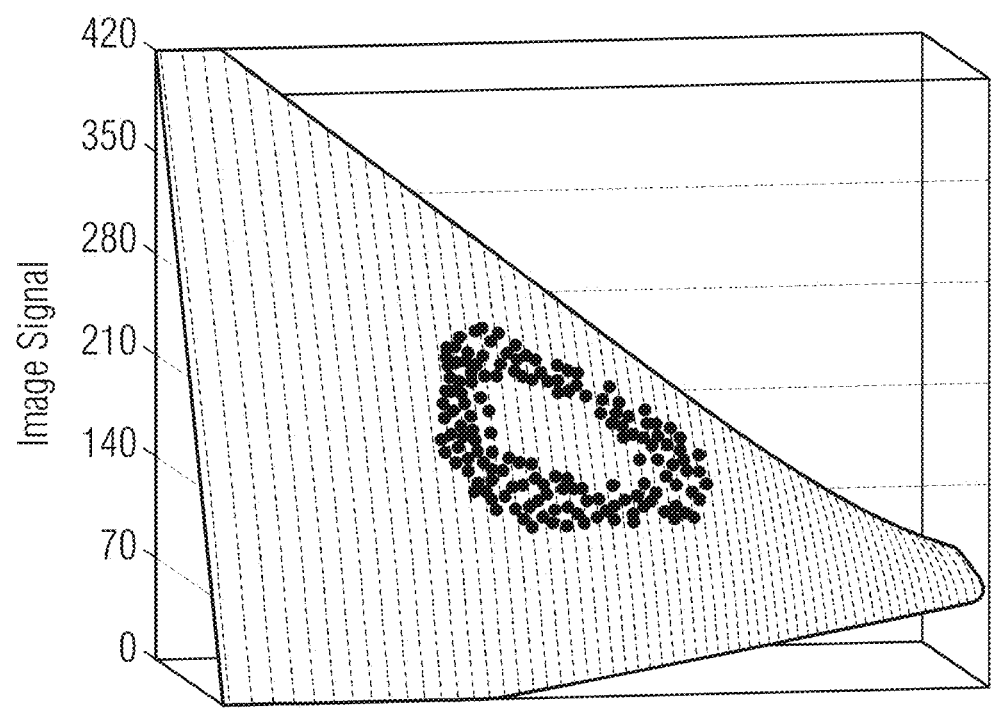
Figure 4C:
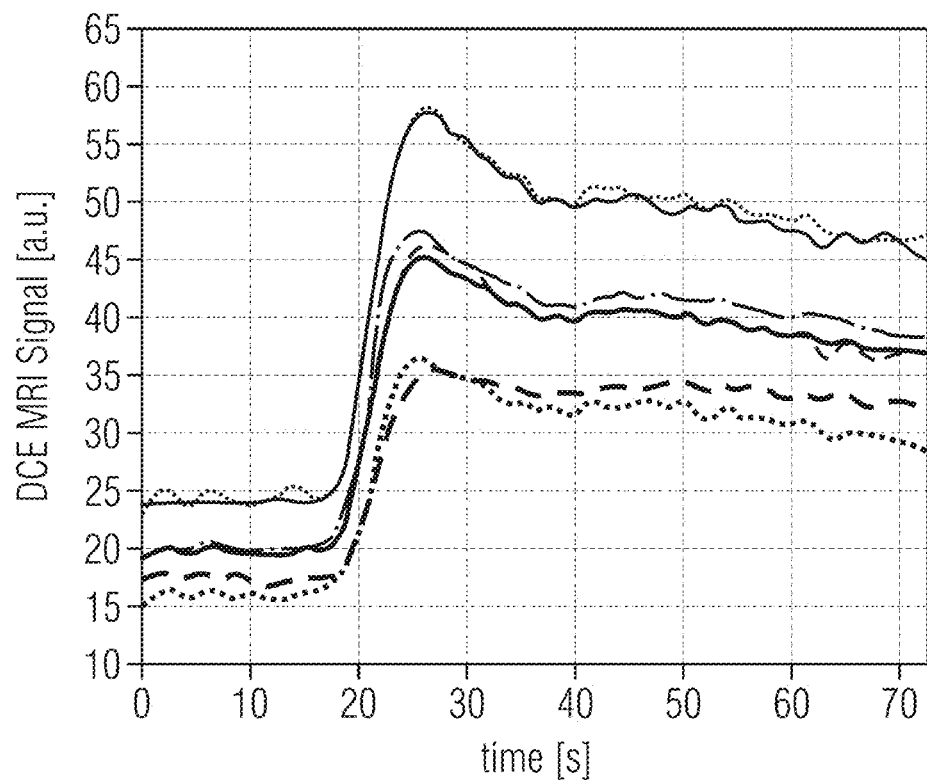
Figure 4D:
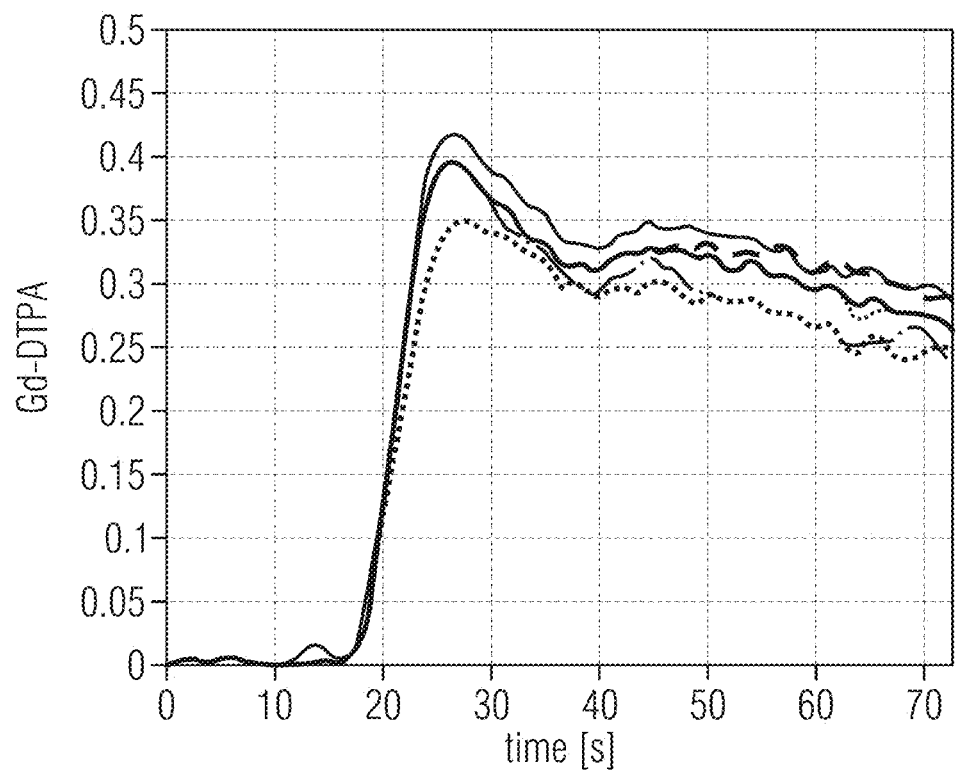

FIG. 2 shows an example of sampling patters for an MRI sampling to enable both a robust estimation of explicit motion in the form of motion fields between the frames of a dynamic MRI image acquisition whilst still maintaining the favorable spatio-temporal properties of the sampled data. The sampling patterns of FIG. 2 illustrating methods of undersampling for frames of dynamic data. Each image shows a characteristic phase-encoding (ky) sample density based on the method of undersampling used. The acquired first spatial image resolution for each data subset was 1.4 mm$^2$, with a total acceleration factor of 7, where only a fraction of 1/7 of the whole k-space data has been acquired in order to speed up the acquisition. Each of FIGS. 2(*a*), 2(*b*) and 2(*c*) represents the phase encoding dimension of k-space data along the x-axis as ky (omitting the fully sampled read-direction from display), with respect to time t vertically downwards along the y-axis. For each pattern, the horizontal direction therefore shows the acquired phase encodes for a single dynamic frame, with the vertical axis showing the variation in sampling over time. The central region situated between line A and line B contains the phase-encoding data necessary to reconstruct an MRI image series at 2.5 mm$^2$ resolution.

FIG. 2(*a*) shows a Compressed-Sensing type pattern promoting maximum spatio-temporal incoherence having a central fully-sampled region. This is where a random or pseudo-random time-sampling of data points takes place, as can be seen by the varying data points across the single dimension of k-space shown, evolving over time. FIG. 2(*b*) shows a standard, temporally interleaved TGRAPPA pattern, leading to spatially and temporally coherent undersampling. The regular undersampling causes a distinctive diagonal line pattern through time across the single dimension of k-space shown. Finally, FIG. 2(*c*) shows a combined pattern having a coherently undersampled central region combined with two regions of incoherently undersampled data. The coherently undersampled central region has a lower degree of temporal sparsity if reconstructed at a reduced resolution— the region between lines A and B. However, once all of the data is reconstructed there remains a significant temporal incoherence, as the majority of the data is randomly sampled in a Compressed-Sensing type data pattern.

FIG. 3 shows PD weighted images and adjacent first frames of the dynamic series of processing images from a temporally regularized (Total-Variation) reconstruction, and representative time-intensity curves on the right. Ignoring the signal difference between PD weighted images and baseline images leads to inaccurate/over-smoothed values for both (FIG. 3b), whereas one or more example embodiments retrieves accurate images and values (FIG. 3a). Because PD weighted image contrast across the myocardium ideally only consists of the coil profile to be corrected for, its contrast is fundamentally different from the rest of the usually saturation-prepared dynamic series. This difference is greatest for the directly adjacent, low-signal baseline frames, and slightly reduces over time as contrast agent wash-in reduces T1 times of most tissues.

FIG. 4 visualizes surface coil intensity correction (SCIC). FIG. 4a shows a segmented stack of a short-axis perfusion series, wherein in FIG. 4b a 2D surface fit to the corresponding portion of the PD weighted image is shown. The corresponding time-signal enhancement curves before applying SCIC is shown in FIGS. 4c (before SCIC) and 4d (after SCIC), wherein corresponding time-signal enhancement curves after applying SCIC. The diagnostically irrelevant PD weighted image frame time points are excluded.

Figure 5:
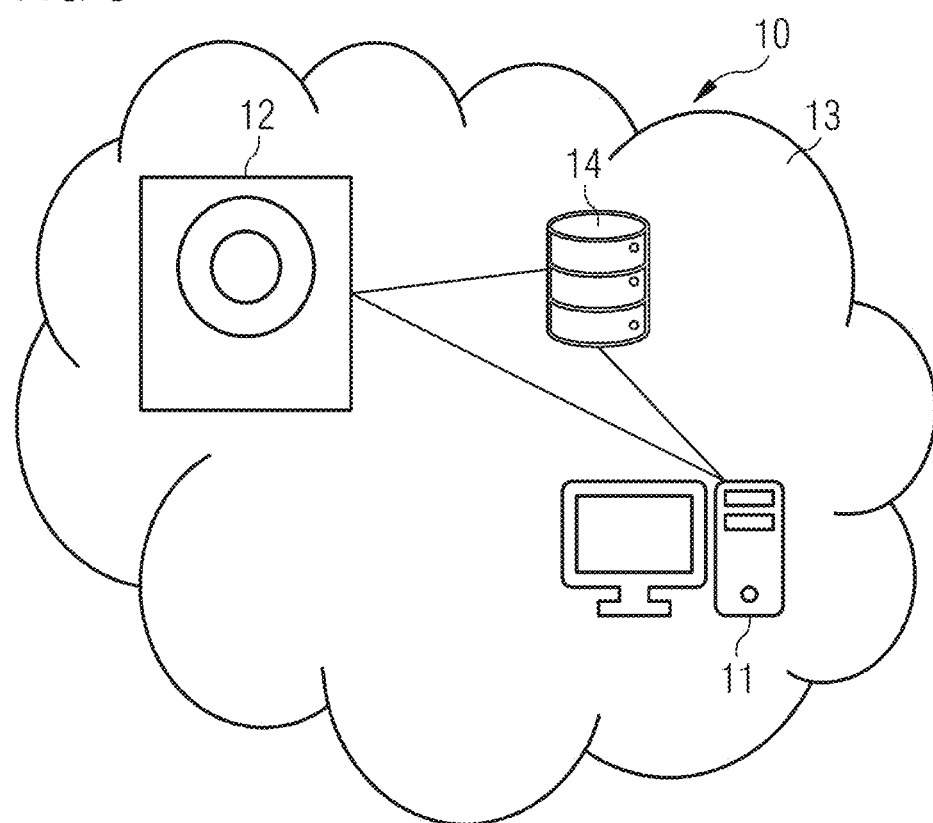

FIG. 5 is a schematic representation of a data processing apparatus 10 adapted to reconstruct a dynamic series of magnetic resonance images of a patient. The data processing apparatus 10 comprises a processor 11 that is adapted to receive information from an imaging device 12. The imaging device 12 is adapted acquire first k-space data of at least one proton density weighted image of the patient and second k-space data of a dynamic series of magnetic resonance images of the patient over successive respiratory and/or cardiac cycles. Although the processor 11 may be directly linked to the imaging device 12 via a wired or wireless data connection, for example, via a communications network 13, data storage 14 is also provided. The data storage 14 may be configured to store raw data directly from the imaging device 12 to be retrieved by the processor 11 when required and is therefore available via the communications network 13 for this purpose. The data storage 14 may also be used to store data during the execution of method steps from the method 100 described above. The processor 11 is therefore adapted to receive or retrieve the first and second k-space data acquired by the imaging device 12. The processor is also adapted to carry out the steps 101 to 109 of the method 100. In addition, a computer program product, comprising instructions which, when executed on a computer such as the data processing system 10, cause the data processing system 10 to carry out the steps of the method 100.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A computer-implemented method of reconstructing a dynamic series of magnetic resonance images of a patient, the computer-implemented method comprising:
   acquiring, by an imaging device, first k-space data of at least one proton density weighted image of a patient;
   acquiring, by the imaging device, second k-space data of a dynamic series of magnetic resonance images of the patient, the dynamic series of magnetic resonance images being acquired over at least one of successive respiratory cycles or successive cardiac cycles;
   reconstructing the at least one proton density weighted image based on the first k-space data to obtain at least one reconstructed proton density weighted image;
   generating a dynamic series of processing images, the dynamic series of processing images including at least two processing images, and the generating the dynamic series of processing images includes reconstructing the at least two processing images based on the second k-space data and a temporal regularization;
   estimating a motion between the at least two processing images to obtain an estimated motion;
   applying a corresponding motion correction to the each respective processing image among the at least two processing images based on the estimated motion to generate a dynamic series of motion corrected images;
   registering the at least one reconstructed proton density weighted image to at least one motion corrected image among the dynamic series of motion corrected images;
   applying a signal intensity correction to the dynamic series of motion corrected images based on the at least one reconstructed proton density weighted image to obtain a signal intensity corrected dynamic series of motion corrected images; and
   providing the signal intensity corrected dynamic series of motion corrected images,
   wherein
      the acquiring the first k-space data is performed before a contrast agent is administered to the patient or before arrival of the contrast agent in a myocardium,
      the acquiring the second k-space data is performed after the contrast agent is administered to the patient or after the arrival of the contrast agent in the myocardium,
      the acquiring the second k-space data acquires the second k-space data for an acquiring time interval after an administering time of the contrast agent, and
      the registering the at least one reconstructed proton density weighted image to the at least one motion corrected image is based on a first motion corrected image acquired in a last third of the acquiring time interval the first motion corrected image being among the dynamic series of motion corrected images.

2. The computer-implemented method of claim 1, wherein
   the acquiring the second k-space data includes,
      undersampling a first k-space, and
      acquiring the second k-space data with a first acceleration factor bigger than 3; and
   the acquiring the first k-space data includes,
      undersampling a second k-space, and
      acquiring the first k-space data with a second acceleration factor smaller than the first acceleration factor.

3. The computer-implemented method of claim 1, wherein the acquiring the first k-space data is performed with a first image resolution, at a first magnetization preparation and at a first flip angle; and the acquiring the second k-space data is performed with a second image resolution, at a second magnetization preparation and at a second flip angle, wherein at least one of, the first image resolution is different from the second image resolution, the first magnetization preparation is different from the second magnetization preparation, or the first flip angle is different from the second flip angle.

4. The computer-implemented method of claim 1, wherein the acquiring the first k-space data includes acquiring the first k-space data based on a sampling pattern; and the sampling pattern samples outer parts of a k-space more sparsely than inner parts of the k-space.

5. The computer-implemented method of claim 1, wherein the generating the dynamic series of processing images includes a spatial regularization of the at least two processing images.

6. The computer-implemented method of claim 1, wherein the reconstructing the at least one proton density weighted image at least one of:

is performed based on a spatial regularization; or is performed without a temporal regularization.

7. The computer-implemented method of claim 1, wherein the applying the signal intensity correction comprises a surface coil intensity correction based on the proton density weighted image.

8. The computer-implemented method of claim 1, wherein the first motion corrected image is a last motion corrected image among the dynamic series of motion corrected images.

9. The computer-implemented method of claim 1, wherein the acquiring the first k-space data and the acquiring the second k-space data acquire data of an imaging section of the patient, the imaging section including a heart of the patient.

10. A non-transitory computer readable medium comprising instructions, which, when executed by a computer, cause the computer to carry out the method of claim 1.

11. A non-transitory computer readable medium comprising instructions, which, when executed by a computer, cause the computer to carry out the method of claim 2.

12. The computer-implemented method of claim 2, wherein the acquiring the first k-space data is performed with a first image resolution, at a first magnetization preparation and at a first flip angler; and the acquiring the second k-space data is performed with a second image resolution, at a second magnetization preparation and at a second flip angle, wherein at least one of, the first image resolution is different from the second image resolution, the first magnetization preparation is different from the second magnetization preparation, or the first flip angle is different from the second flip angle.

13. The computer-implemented method of claim 12, wherein the acquiring the first k-space data includes; acquiring the first k-space data based on a sampling pattern; and the sampling pattern samples outer parts of a k-space more sparsely than inner parts of the k-space.

14. The computer-implemented method of claim 13, wherein the generating the dynamic series of processing images includes a spatial regularization of the at least two processing images.

15. The computer-implemented method of claim 14, wherein the reconstructing the at least one proton density weighted image at least one of:

is performed based on a spatial regularization; or is performed without a temporal regularization.

16. The computer-implemented method of claim 15, wherein the applying the signal intensity correction comprises a surface coil intensity correction based on the proton density weighted image.

17. The computer-implemented method of claim 16, wherein the first motion corrected image is a last motion corrected image among the dynamic series of motion corrected images.

18. The computer-implemented method of claim 17, wherein the acquiring the first k-space data and the acquiring the second k-space data acquire data of an imaging section of the patient, the imaging section including a heart of the patient.

19. A processing apparatus configured to reconstruct a dynamic series of magnetic resonance images of a patient, the processing apparatus comprising:

an imaging device configured to, acquire first k-space data of at least one proton density weighted image of a patient, and acquire second k-space data of a dynamic series of magnetic resonance images of the patient the dynamic series of ma etic resonance images being acquired over at least one of successive respiratory cycles or successive cardiac cycles;

a processor configured to, reconstruct the at least one proton density weighted image based on the first k-space data to obtain at least one reconstructed proton density weighted image, generate a dynamic series of processing images, the dynamic series of processing images including at least two processing images, and the generation of the dynamic series of processing images includes reconstructing the at least two processing images based on the second k-space data and a temporal regularization, estimate a motion between the at least two processing images to obtain an estimated motion, apply a corresponding motion correction to each respective processing image among the at least two processing images based on the estimated motion to generate a dynamic series of motion corrected images, register the at least one reconstructed proton density weighted image to at least one motion corrected image among the dynamic series of motion corrected images, and apply a signal intensity correction to the dynamic series of motion corrected images based on the at least one reconstructed proton density image to obtain a signal intensity corrected dynamic series of motion corrected images; and an interface adapted to provide the signal intensity corrected dynamic series of motion corrected images, wherein the processor is configured to, acquire the first k-space data before a contrast agent is administered to the patient or before arrival of the contrast agent in a myocardium, acquire the second k-space data after the contrast agent is administered to the patient or after the arrival of the contrast agent in the myocardium, acquire the second k-space data for an acquiring time interval after an administering time of the contrast agent, and register the at least one reconstructed proton density weighted image to the at least one motion corrected image based on a first motion corrected image acquired in a last third of the acquiring time interval, the first motion corrected image being among the dynamic series of motion corrected images.

20. The processing apparatus of claim 19, wherein the first motion corrected image is a last motion corrected image among the dynamic series of motion corrected images.

* * * * *